United States Patent
Greenway et al.

[11] Patent Number: 5,952,026
[45] Date of Patent: Sep. 14, 1999

[54] PROCESS FOR MAKING POTATO CHIP HAVING NO ADDED FAT OR GLOBULAR PROTEIN

[76] Inventors: Frank L. Greenway, 4411 W. 233rd St., Torrance, Calif. 90505; George A. Bray, 1796 E. Augusta Dr., Baton Rouge, La. 70810

[21] Appl. No.: 08/125,504

[22] Filed: Sep. 22, 1993

Related U.S. Application Data

[63] Continuation of application No. 07/914,893, Jul. 16, 1992, abandoned, which is a continuation-in-part of application No. 07/380,739, Jul. 17, 1989, abandoned, which is a continuation of application No. 07/225,070, Jul. 27, 1988, abandoned, which is a continuation of application No. 06/816,386, Jan. 6, 1986, abandoned, which is a continuation of application No. 06/703,221, Feb. 19, 1985, abandoned.

[51] Int. Cl.[6] .................................................. A23L 1/217
[52] U.S. Cl. ........................ 426/241; 426/242; 426/637; 426/808
[58] Field of Search ................................. 426/241, 242, 426/243, 637, 808; 219/10.55 B

[56] References Cited

U.S. PATENT DOCUMENTS

| | | | |
|---|---|---|---|
| 3,365,301 | 1/1968 | Lipoma | 426/242 |
| 3,402,049 | 9/1968 | Mancuso et al. | 426/637 X |
| 3,881,028 | 4/1975 | Capossela et al. | 426/242 |
| 4,073,952 | 2/1978 | Standing et al. | 426/242 |
| 4,160,039 | 7/1979 | Schnell | 426/637 X |
| 4,190,756 | 2/1980 | Foerstner | 219/10.55 B |
| 4,283,425 | 8/1981 | Yuan et al. | 426/242 X |
| 4,800,090 | 1/1989 | August | 426/243 |
| 4,906,483 | 3/1990 | Kloos | 426/243 |
| 4,919,965 | 4/1990 | Childers | 426/637 X |

FOREIGN PATENT DOCUMENTS

| | | | |
|---|---|---|---|
| 1506166 | 4/1978 | United Kingdom | 426/637 |

*Primary Examiner*—Arthur L. Corbin

[57] ABSTRACT

A potato chip having no added fat and process for preparation thereof, wherein a slice of undehydrated fresh potato having no added fat and no coating of globular protein and having a thickness of about 1 to about 3 millimeters is heated in a microwave oven at high intensity, with periodic heating separated by periodic cooling for a period of time sufficient to produce a product having essentially the same flavor, color and crispness as potato slices fried in deep fat. The resulting potato chip has substantially reduced calories as compared with potato chips fried in deep fat or oil, and has essentially the same low fat content as uncooked potatoes. Optionally, the slice may be coated with a non-globular protein coating prior to microwave heating. Such a coating may include salt, non-globular protein, flavorants, spices, and/or vitamin additives, as desired, but preferably does not contain any fat which would increase the fat and calorie content of the finished potato chip.

12 Claims, No Drawings

PROCESS FOR MAKING POTATO CHIP HAVING NO ADDED FAT OR GLOBULAR PROTEIN

CROSS REFERENCE TO RELATED APPLICATIONS

This application is a continuation of Ser. No. 07/914,893, filed Jul. 16, 1992, now abandoned which is a continuation-in-part of application Ser. No. 07/380,739, filed Jul. 17, 1989, now abandoned, which is a continuation of Ser. No. 07/225,070, filed Jul. 27, 1988, now abandoned, which is a continuation of Ser. No. 816,386, filed Jan. 6, 1986, now abandoned, which is a continuation of Ser. No. 703,221, filed Feb. 19, 1985, now abandoned.

BACKGROUND OF THE INVENTION

This invention relates to food products, and more particularly, to potato chips.

Snack foods have become a part of the diet of many persons. Some of the more popular snack foods contain undesirably high levels of ingredients introduced during the preparation process, one of the more important being high levels of fat. Although certain amounts of fat are necessary in the diet of most persons, deep-fat-fried snack foods may contain as much as 50% by weight of fat, which is soaked into the food product during the deep-fat frying. Such high levels of fat consumed in the snack food can lead to a fat imbalance in the body, which in turn can have adverse health effects, and the fat also adds to the calorie content of the snack food.

One of the more popular snack foods for many years has been potato chips. Conventional potato chips are prepared by placing raw or blanched potato slices into deep-fat or oil cookers, with the deep-fat or oil frying resulting in a reduction of moisture content to less than 5%, but also resulting in an undesirable increase in the oil or fat content to the range of about 30–50% of the total weight of the chip. This high fat content is undesirable in the diet when potato chips are consumed in large quantities, and the high fat content also leads to shortened shelf life of the potato chip due to the infused fat becoming rancid over a period of time. Further, deep-fat frying is inherently a difficult and expensive manufacturing operation, due to the cost of the fat, and safety and other problems associated with the presence of large quantities of hot oil.

There have been many attempts to reduce the fat content of potato chips, while retaining product features required for consumer acceptance, such as crispness, a pleasing mouth feel, an acceptable taste, a wrinkled texture, and a light brown appearance after cooking. In one approach, non-fatty liquids such as silicones may be substituted for the cooking fat. In another approach, only a portion of the cooking operation is carried out in a deep fat fryer, with the remaining portion being accomplished in an air-circulating oven or a microwave oven. Various other types of heaters such as radiant heaters have also been tried.

As indicated, there have been attempts to utilize microwave heating in the preparation of potato chips. Microwave heating has been used in conjunction with deep fat frying. However, it has been reported that reducing the water content of a potato slice with a microwave by more than a few per cent prior to deep fat frying causes an unduly hard and dry potato chip because of excessive starch gelatinization. According to U.S. Pat. No. 4,283,425 to Yuan, et al., preparation of a chip from a slice of potato having acceptable characteristics has been accomplished entirely by microwave heating, but only when the potato slice is first coated with a globular protein before microwave cooking. Yuan. et al., teaches that preferably, a second layer, of edible fat or oil should be coated on the potato slice over the globular protein coating. Prior to the invention, the protein coating was thought to be essential in the preparation of a potato chip by this process, and it was believed that the globular protein forms a translucent film on the surface of the potato chip to give the proper appearance, texture and color.

While the latter approach of Yuan, et al., results in greatly reduced fat content, particularly when a layer of edible fat or oil is not applied, this process still requires coating the potato slice with a globular protein. In the preferred embodiment of the Yuan. et al. approach, after the potato slice is coated with the globular protein, the chip is then coated with oil by dipping or spraying, and is then cooked in a microwave oven.

Thus, there exists a continuing need for an improved potato chip having no added fat or globular protein coating. Such a chip would desirably be prepared from potatoes without the need for any precooking coatings, particular globular protein coatings or any oils or fats, but which would be compatible with the use of non-globular protein additives such as surface coatings of salt, non-globular protein flavorants, spices or other ingredients. The flavor, texture, appearance and other features of the potato chip must be acceptable to the consumer, and should be at least as goods as for existing potato chips. The process for preparing the potato chip must also be sufficiently economical to be commercially practical. The present invention fulfills this need, and further provides related advantages.

SUMMARY OF THE INVENTION

The present invention resides in an improved potato chip, and process for preparation thereof, having no added fat or globular protein coatings. The potato chip of the invention has substantially the same texture, color and appearance as conventional potato chips. Although the evaluation of taste is somewhat subjective, it is believed that the taste of the potato chip of this invention is essentially equivalent to that of conventional deep-fat or oil fried potato chips, except, of course, the natural potato flavor is not overshadowed by the oil flavor found in conventionally prepared potato chips, or chips prepared by the preferred process of Yuan, et al.

In accordance with the present invention, a potato chip having no added fat is made by preparing a slice of fresh, substantially undehydrated potato, the slice having a thickness of from about 1 to about 3 millimeters. The slice, not coated with globular protein, is then heated in a microwave oven for a period of time sufficient to produce a potato chip having substantially the same flavor, color and crispness as deep fat fried potato slices, yet having no added fat. Preferably, the microwave energy is applied to provide energy input comparable with that of deep fat frying, together with periods of low or zero energy input to avoid burning by allowing the chip to cool. Optionally, after the slice is cut, and before or after it is heated, it may be coated with a fat-free and globular protein-free coating such as an aqueous solution of salt, a non-globular protein flavorant, spices or a vitamin additive.

In a preferred embodiment, a potato slice about 2 millimeters thick is first cut from washed potatoes, either with the potato skins in place or after peeling the potatoes. The slice is then placed onto a cooking surface such as paper or ceramic, and the surface is placed into a microwave heating unit. The microwave heating unit may be an industrial oven or a home microwave unit operating with a high power level and, for example, at about 2450 megahertz (MHz) frequency. The 2 millimeter thick potato slice is heated in the microwave oven for a period of from about 4 to about 10 minutes, until the surface has achieved the light brown appearance characteristic of conventional deep-fat-fried potato chips. Power is preferably applied for about 2 minutes, power is removed for about 1 minute, and the cycle is repeated until cooking is complete. The periodic heating allows the chip to be properly dehydrated and cooked, without burning. It is found that the resulting potato chip is fully cooked and crisp, and otherwise has the appearance of a conventional potato chip. In a variation of this preferred embodiment, the potato slice may be dipped into a 3% to 10% by volume solution of sodium chloride salt in water for 10 seconds, prior to placing the slice into the microwave oven. After the microwave heating treatment, the resulting potato chip of this variation has pleasantly salty taste which may be desirable to some persons.

It will be appreciated that the present invention represents an important advance in the field of snack foods, particular potato chips. The potato chips of the present invention have no added fat and a reduced calorie content, as compared with conventional deep fat or oil fried potato chips, yet have acceptable flavor, crispness, texture, appearance and other features of conventional potato chips, so that these potato chips are acceptable to consumers. Also, unlike the potato chips produced by the Yuan, et al. method, there is no need to coat the potato slices with globular-protein prior to microwave cooking, thus providing a simpler and less costly process and more natural chip than was previously known. Moreover, the process of this invention for preparing the potato chips is more readily controlled, is relatively less expensive due to the absence of fat and deep-fat-frying apparatus, and allows the use of the high-sugar-content potatoes which heretofore have not been usable for preparing potato chips because of their tendency to burn in deep fat or oil frying. Finally, the potato chips of the present invention have significantly extended shelf lives as compared with conventional potato chips, because of the absence of infused oil or fat as chips prepared by the preferred embodiment of the Yuan, et al. patent, which can turn rancid during storage due to the use of oil.

The potato chip of this invention can also be prepared by a combination of microwave cooking to cook the potato chip followed by further dehydration of the cooked chip in a conventional oven or by other means to remove excess moisture from the microwave cooked potato chip. The preparation of a potato chip by this alternate method is desirable from a cost standpoint since the microwave treatment will only be required during the cooking phase of the potato chip, with dehydration being achieved with lower cost apparatus, such as conventional dry air ovens.

Other features and advantages of the present invention will become apparent from the following more detailed description, which illustrates, by way of example, the principles of the invention.

DETAILED DESCRIPTION OF THE PREFERRED EMBODIMENT

In accordance with a preferred embodiment of the invention, fresh, undehydrated potato slices having a thickness of from about 1 to about 3 millimeters, preferably 2 millimeters, are prepared from Russett potatoes. The potatoes may be previously peeled to remove the skins, or washed with the skins in place. The thickness of the potato slice is greater than that of conventional potato chips which are to be deep fat fried, and is somewhat comparable with the thickness of thicker or "hawaiian" potato chips. It is believed that the thickness of the potato slice is important in achieving a satisfactory potato chip in the subsequent microwave treatment. If the thickness of the slice is less than about 1 millimeter, the final product is too fragile for handling and packaging. Conversely, if the thickness of the potato slice is greater than about 3 millimeters, the finished product tends to be too hard and tastes more like a baked potato than a conventional potato chip. (Note that the thicknesses specified are to be measured on the potato slices prior to the microwave treatment, as the thickness of the slice decreases during the microwave processing as the water content is reduced.)

Although not wishing to be bound by this possible explanation, it is believed that the thickness of from about 1 to about 3 millimeters allows the simultaneous achieving of the desired surface texture and color, cooking of the potato within the chip, and reduction of the water content of the chip to less than about 5% of the total weight to achieve the desired crispness. The microwave cooking process heats the potato slice throughout its entire thickness, causing cooking, while at the same time driving out moisture. Alternately, after the chip is microwave cooked, non-microwave dehydration means, such as with conventional ovens or warm air dehydrators may be utilized to reduce the moisture content of the chip to the desired level. The potato slices of the indicated thickness achieve a desirable balance between these two processes, while at the same time achieving a desirable degree of browning of the surface of the final potato chip. It is found that the most satisfactory potato slice has a thickness of about 2 millimeters before cooking.

There is no known limitation on the type of potato utilized in preparing the potato chips of the present invention. The potatoes are generally of the type known as "Irish" potatoes, which is not a specific variety but is only to be contrasted with a sweet potato. Contrary to prior belief, neither deep fat frying nor the presence of special coatings (e.g. globular protein) on the surface of the potato slices are necessary to achieve a desirable finished potato chip, using such potatoes as the starting material. In the conventional preparation of potato chips, only potatoes having relatively low sugar content may be used, as higher sugar content potato slices tend to burn in deep fat or oil frying. The present approach allows the use of higher sugar content potatoes, as there is a reduced tendency to burn in the microwave heating. The presently preferred potato variety is the Russett potato, but there is no known limitation on the variety of potato used in the process.

After slicing, the potato slices may optionally be washed and blotted dry. There should not be an excess of moisture present on the potato slice when it is placed in the microwave oven. Also, the potato slice should not be substantially dehydrated prior to placing it into the microwave oven. That is, potatoes typically have a moisture content of at least about 75% by weight. The potato slices as used in the present invention should not be dehydrated substantially, as by prior cooking in a hot air oven, prior to the microwave heating. A substantial reduction of the moisture content interferes with the balance between moisture removal, cooking of the potato slice, and browning of the surface during the microwave treatment. Microwaved chips that have been previously dehydrated tend to be hard, tough and pithy in texture and mouth feel, whitish in color, and to have a taste more characteristic of a baked potato than a potato chip. This is not to say that the sliced potatoes may not be exposed to the air for a period of time prior to microwave cooking, even though a minor degree of dehydration may result. Exposure to the air causes the potato slice to darken somewhat, and this darker color is carried into the processed chip. However, the exposure to air and the darker color do not adversely affect that taste of the processed chip product.

The potato slices are then placed on a supporting surface such as paper, ceramic, glass, plastic, or other microwave compatible material. The cooking surface with the potato slices thereon is placed into a microwave heating oven of the type commonly used in homes or restaurants, or of the type utilized in industrial cooking and processing. Such ovens may operate at a variety of frequencies, but typically operate in the frequency range 500–4000 MHz. The examples reported herein were prepared utilizing a commercially available microwave oven having a frequency of about 2450 MHz, but it is believed that other frequencies are equally acceptable.

The total microwave heating times herein vary depending upon the thickness of the slice and the type of potato used to prepare the slices, and upon the intensity of the microwave energy. For a slice having a thickness of about 1 millimeter, a microwave heating time of from about 3 to about 5 minutes has been found satisfactory. For a potato slice having a thickness of about 3 millimeters, a microwave heating time of from about 8 to about 12 minutes has been found satisfactory. For the preferred potato slice thickness of about 2 millimeters, a microwave heating time of from about 4 to about 10 minutes has been found satisfactory.

A high level of microwave energy is applied to the potato slice to promote rapid heating and cooking. If a low intensity is used, the final chip tends to have a taste characteristic of baked potatoes, rather than the desired taste characteristics of deep fat fried potatoes. If the high level of microwave energy is continuously applied, the potato slice may undesirably change color to become brown before crispness is achieved, leading to too dark a color of the final product. It is therefore preferred to apply the high energy level with intermittent zero or very low level of microwave energy periodically, alternating the high energy levels. It is thought that the high microwave energy intensity produces changes in the potato like those of the high-intensity deep fat immersion process, without the addition of fat or oil, globular protein, or any other foreign substance to the potato. The intermittent application of high energy allows the chip to reach its desired color and crispness levels at about the same time. For example, to cook the chip for 8 minutes, it is preferred to apply 4 microwave pulses, each of 2 minutes duration. Each pulse is separated from other pulses by a period of about 1–2 minutes of zero energy intensity. Shorter or longer pulse durations and separations are acceptable. For example, longer pulse durations are preferred for thicker chips, and shorter pulse durations are preferred for thinner chips. Alternately, the microwave pulses may be administered in declining time intervals as the chip is progressively cooked, and is then crisped.

After the potato chips are removed from the microwave oven, no further processing is required. The thickness of the chip is reduced from the corresponding potato slice thickness of about 2 millimeters, the final chip thickness is about 1 millimeter. The potato chip is typically somewhat buckled and wavy in cross-sectional configuration, presumably because of localized boiling of water in the slice, variations in the density of the solid matter within the initial potato slices, or possibly other reasons. The surface of the finished potato chip has a texture comparable with that of potato chips prepared by deep fat frying, and also has a comparable light brown color of varying shades and intensities. Because the intensity of the heating in the microwave oven is not quite as great as that of deep-fat frying, it is found that the potato chips of the present invention have a lesser tendency to be burned.

The potato chip of the present invention has the desirable crispness and mouth feel comparable to that of deep-fat-fried potato chips. While taste testing is subjective and consumer preferences may vary, the taste of the potato chips of the present invention is generally comparable to the taste of conventional potato chips, except of course, the potato flavor is not overshadowed by oil flavor. A portion of the taste of conventional potato chips without added salt results from the presence of the fat or oil absorbed during the cooking process, and this fat or oil flavor tends to dominate the mask the potato flavor inherent in the cooked potato chip product. Because the potato chip of the present invention has no added fat or oil, and has a fat level of substantially zero, the only recognizable flavor is that of the cooked potato. Such a potato chip is therefore judged to have better taste by persons preferring the taste of potatoes, and a comparable taste by persons who have a greater preference for the taste of the fats and oils in which the potato slice is fried in conventional processing. Moreover, the potato chips produced by the present invention are practically identical in appearance, mouth feel, crispness and flavor, to chips produced by the method not employing an oil coating. The fundamental potato chip characteristics are thus present in the chip of the present invention without added fat or added globular protein.

The absence of fat in the potato chip of the present invention substantially increases its shelf life. Products which have been dried inherently have improved resistance to microbiological growth and degradation, and therefore typically have long shelf lives. However, conventional potato chips include large amounts of absorbed fat, which can turn rancid even in sealed bags. The shelf life of deep-fat-fried potato chips is therefore typically a few weeks in sealed bags, and a shorter time in unsealed bags exposed to ambient conditions. Potato chips of the present invention produced without the addition of fats or oils, or other degradable additives, have extended shelf lives. Such potato chips have been stored in unsealed bags for periods of at least nine months, without noticeable microbiological growth of loss of flavor as compared with freshly prepared potato chips of the present invention. Chips stored for long periods may lose crispness as water is absorbed, but crispness may be restored by heating the chip for a short time in an oven or microwave oven to drive out excess water.

If desired, the potato slices of the invention may be coated with a non-globular protein and non-fatty coatings prior to, or after, the microwave treatment. The commercially most important such coating is one containing salt, since many persons prefer potato chips having some degree of saltiness. A salt-containing coating may optionally be placed onto the potato slices prior to microwave heating, by any of several techniques. For example, the potato slices may be dipped into an aqueous solution containing about 3% to 10% sodium chloride salt, for a period of about 10 seconds. This dipping treatment results in the absorption of a small amount of salt into the surface of the potato slice, so that after the microwave heating, the potato chip has a pleasantly salty taste. The concentration of the salt in the aqueous solution and the period of dipping the potato slice may be varied to increase or decrease the amount of salt in each potato slice, thereby changing the saltiness of final potato chip product.

It is found that application of such a coating does not require any alteration in the other steps of preparing the potato chip, as long as excess moisture is removed prior to the microwave treatment. It is believed that the salt could be applied in other ways, as by spraying a salt-containing solution onto one or both sides of the potato slice, or by brushing one or both sides of potato slice with the salt-containing solution.

It is believed that other types of non-globular protein flavoring coatings may also be satisfactorily applied to the potato slices prior to microwave heating. Such coatings could contain flavoring ingredients to provide specific taste features to the final potato chip, such as simulated cheese, nacho, or sour cream flavorings. Non-globular protein nutritional additives could also be coated onto the potato chip, as long as the nutrients do not significantly degrade at the microwave heating temperature. The coatings may have to be modified slightly from those used for conventional deep-fat-fried potato chips, since the fat on such chips aids the applied coatings to stick to the chip. It is emphasized that all such coatings of salt, flavorants, nutrients and other materials are optional, and may be used as long as they do not interfere with the microwave heating process. Such non-globular protein coatings, are not required to achieve a satisfactory potato chip, as has been thought in the case in some prior processes for preparing potato chips, such as the process taught by Yuan, et al.

The following examples are presented to illustrate aspects of the invention, and should not be taken as limiting the invention in any respect.

EXAMPLE 1

Using the meat slicer, slices of fresh Russett variety potatoes were cut having thicknesses of about 0.5, 1.0, 1.5, 2.0, 3.0 and 4.0 millimeters. One each of the slices of these thicknesses were placed on corrugated plastic plates and the plates were placed into a hometype commercial microwave oven having an operating frequency of 2450 MHz. Plates containing one each of the various thicknesses were heated in the microwave oven operating at high energy intensity using periodic pulses of microwave energy. For slices of initial thickness 0.5 or 1. millimeter, the pulses were ½ or 1 minute long, with comparable separations of zero microwave energy. For thicker slices, the pulses were 1 to 2 minutes long, with comparable separations. Samples were checked between each pulse. Chips prepared from slices initially having thicknesses from about 1 to about 3 millimeters were essentially indistinguishable from conventional potato chips, but had no added fat and no fatty taste. It was observed that chips prepared from slices of thickness less than about 1 millimeter tended to be fragile, but had an acceptable taste. Chips prepared from slices having thicknesses greater than about 3 millimeters were tough, hard, and had a tasted characteristic of baked potatoes.

EXAMPLE 2

Potato slices about 3 millimeters thick and dehydrated to about 10% moisture were heated by microwave energy for various times and pulse durations. In each case, a satisfactory chip could not be prepared, as the microwaved, dehydrated slices were pithy.

EXAMPLE 3

Slices of fresh Russett potatoes having a thickness of about two (2) millimeters were prepared using a meat slicer. After slicing, but before heating in the microwave oven, the slices were dipped for 10 seconds into an aqueous solution of 3% by volume sodium chloride salt. The dipped slices were placed onto tissue to blot any excess water content, and then were placed onto plastic plates for microwave heating of about 8 minutes, accomplished in 4 pulses each of 2 minutes duration, separated by 2 minute periods of zero intensity. The resulting potato chips were substantially identical in appearance, mouth feel, and taste to those of the same thickness and heating time as prepared in Example 1 without any salt added, but additionally had the pleasantly salted taste associated with salted potato chips.

EXAMPLE 4

The potato chips produced by following the steps of Example 3 were compared to potato chips prepared in a manner taught by Example 1, Group I of Yuan, et al., as follows:

Slices of raw Russett potatoes having a thickness of about two (2) millimeters were prepared using a meat slicer. After slicing, but before heating in the microwave oven, the slices were dipped for 10 seconds into an aqueous solution of 5% soy protein isolate and 3% by volume sodium chloride salt. The dipped slices were placed onto tissue to blot any excess water content, and then were placed onto plastic plates for microwave heating of about 8 minutes, accomplished in 4 pulses each of 2 minutes duration, separated by 2 minute periods of zero intensity. The chips prepared by this method were very similar in appearance, mouth feel, and taste to those chips prepared by the method of Example 3.

EXAMPLE 5

Slices of fresh Russett potatoes having a thickness of about two (2) millimeters were prepared using a meat slicer. After slicing, but before heating in a microwave oven, the slices were dipped for 10 seconds in an aqueous solution of 3% by volume sodium chloride salt. The dipped slices were placed onto tissue to blot any excess water from the surface of the slices and then they were placed onto a plastic plate for microwave cooking and crisping, as follows:

Phase 1—Microwave Cooking
  2 minutes of microwave cooking, then turn;
  2 minutes of cooling;
  2 minutes of microwave cooking, then turn;
  2 minutes of cooling;
  1 minute of microwave cooking, then turn;
  1 minute of cooling;
  1 minute of microwave cooking, then turn;
  1 minute of cooling;
  30 seconds of microwave cooking, then turn;
  1 minute of cooling;
  30 seconds of microwave cooking, then turn;
  1 minute of cooling;
  15 seconds of microwave cooking, then turn;
  1 minute of cooling;
  15 seconds of microwave cooking, then turn;
  1 minute of cooling;
  15 seconds of microwave cooking;
  1 minute of cooling; and
  15 seconds of microwave cooking.

Phase 2—Microwave Crisping
  15 seconds of microwave crisping;
  1 minute of cooling;
  15 seconds of microwave crisping;
  1 minute of cooling;
  15 seconds of microwave crisping;
  1 minute of cooling;
  15 seconds of microwave crisping;

1 minute of cooling;
15 seconds of microwave crisping;
1 minute of cooling;
15 seconds of microwave crisping;
1 minute of cooling;
15 seconds of microwave crisping;
1 minute of cooling;
15 seconds of microwave crisping;
1 minute of cooling;
15 seconds of microwave crisping;
1 minute of cooling;
15 seconds of microwave crisping;
1 minute of cooling; and
15 seconds of microwave crisping.

The cooking phase was followed by the crisping phase. The resulting potato chips were substantially identical in appearance, mouth feel and taste to those of the same thickness and heating time as prepared in Example 1 without any added salt, but additionally have the pleasantly salted taste associated with salted potato chips. Turning of the chips was carried out to prevent the chips from sticking to the microwave surface. It is anticipated that turning could be eliminated if a non-stick potato chip support surface is used and/or the potato chip support surface is moved relative to the potato chip to prevent sticking.

EXAMPLE 6

As a comparison to the method of Yuan, et al., potato chips were here prepared by the method of Example 5, except that the potato slices were dipped in an aqueous solution of 3% by volume sodium chloride salt and 5% soy protein isolate instead of simply 3% by volume sodium chloride salt. Potato chips prepared by the method of Example 6 were judged to be substantially identical in appearance, mouth feel and flavor to the potato chips prepared by the method of Example 5.

EXAMPLE 7

Potato chips were prepared by the method of Example 5 above, except that the crisping of phase 2 was replaced by crisping in a conventional convection oven. After, microwave cooking Phase 1 was completed, the chips were transferred to a convection oven which had previously been heated, and was turned off. The door of the warm oven was left slightly open with the plate of chips left inside for several hours until the chips were crisped. The resulting chips were found to have an appearance, a mouth feel and a flavor nearly indistinguishable from the potato chips prepared by the method of Example 5.

EXAMPLE 8

Potato chips were prepared by the method of Example 6 above, following Yuan, et al., except that the crisping Phase 2 was replaced by the conventional oven crisping of Example 7 above. There was no perceptible difference between the potato chips prepared by the methods of Examples 7 and 8.

EXAMPLE 9

Samples of potato chips, prepared from 2 millimeter thick potato slices, prepared without a salt addition, as in Example 1, and with a salt addition, as in Example 3, were stored in unsealed bags for a period of nine months. At various intermediate times, and after the nine-month storage period, samples were removed and evaluated. The physical appearance of the potato chips did not change during the nine-month storage test, or during any shorter period, and there was no evidence of any microbiological growth on any of the stored chips. Some of the chips did absorb small amounts of moisture, and lost their crispness. These chips were heated in a microwave for about 30 seconds to drive out moisture and restore their crispness. The stored chips were tasted and judged to be substantially identical in taste, texture, and appearance to the freshly prepared product. It was therefore concluded that the shelf life of such chips is significantly greater than that prepared by conventional deep fat frying.

EXAMPLE 10

Slices of fresh Russett potato about 1.5 millimeters thick were microwave heated by three different approaches. In the first, slices were continuously heated at a high intensity for about 5 minutes. The chips were brown and burned after the treatment. Other slices were periodically heated at high intensity for five minutes, in 5 pulses each of 1 minute duration, each pulse separated by a 2 minute period of zero applied energy. These slices were comparable in appearance, crispness and mouth feel with conventional deep-fat-fried potato chips. Yet other slices were heated at an intensity level of one-tenth that of the prior intensity, continuously for various periods of time such as about 6 minutes. The resulting chips had a less appealing taste than those heated periodically at high intensity.

A summary of the comparison of the appearance, mouth feel, and taste between chips prepared with and without the addition of soy isolate protein, (taught by Yuan et al. to be essential to the preparation of microwave potato chips) is set forth in Table I, wherein preparation methods and characteristics of the resulting chips prepared by Examples 3–8 are compared.

Examples 3, 5 and 7 are chips prepared without soy isolate protein, and Examples 4, 6 and 8 are chips identically prepared, respectively, as the chips Examples 3, 5 and 7, except for the addition of 5% soy isolate protein. As is readily apparent from Table I, soy isolate protein is not in fact required to produce acceptable microwaved potato chips.

The potato chip of the present invention therefore provides important advantages over prior potato chips, in both nutritional and commercial aspects. The potato chips of the present invention have no added fat and have a reduced calorie content of about 90 calories per ounce, as compared with a calorie content of about 150 calories per ounce for conventional deep fat fried potato chips. Moreover, the potato chips of the present invention do not need to be first coated with a globular protein layer, thus removing what was previously thought to be an essential step for purely microwave cooking. The same results were achieved by a combination of microwave cooking and microwave crisping as with microwave cooking and dehydration and crisping by heating in an oven.

The potato chips of the present invention may be prepared without using costly cooking fats, in apparatus which is safer and less costly than deep fat frying apparatus. Significantly, the shelf storage life of the potato chips, in both sealed and open containers, is greatly extended over that of conventional potato chips. The potato chips of the present invention are not greasy in feel, which can be a significant convenience for consumers. Although a particular embodiment of the invention is described in detail for purposes of illustration, various modifications may be made without departing from the spirit and scope of the invention. Accordingly, the invention is not to be limited except as by the appended claims.

TABLE 1

| Example No. | Method Of Preparation | Appearance | Mouth Feel | Taste |
|---|---|---|---|---|
| 3 | 2 mm thick raw potato slices, with 3% aqueous sodium chloride soak, microwave cooking and crisping by 4–2 minute microwave pulse sequences | essentially similar to conventional potato chips | essentially similar to conventional potato chips, except less oily texture | similar to conventional potato chips except a less oily flavor |
| 4 | same as Example 3, except that aqueous solution contains 5% soy isolate protein to mimic the Yuan,etal. chip | essentially similar to conventional potato chips | essentially similar to conventional potato chips, except less oily texture | similar to conventional potato chips except a less oily flavor |
| 5 | 2 mm thick raw potato slices, with 3% aqueous sodium chloride soak, cooking and crisping by incrementally declining microwave pulse sequences | essentially similar to conventional potato chips | essentially similar to conventional potato chips, except less oily texture | similar to conventional potato chips except a less oily flavor |
| 6 | same as in Example 5, except that the aqueous solution contains 5% soy isolate protein to mimic the Yuan, etal. chip | essentially similar to conventional potato chips | essentially similar to conventional potato chips, except less oily texture | similar to conventional potato chips except a less oily flavor |
| 7 | 2 mm thick raw potato slices, with 3% aqueous sodium chloride solution soak, microwave cooking and conventional oven crisping | essentially similar to conventional potato chips | essentially similar to conventional potato chips, except less oily texture | similar to conventional potato chips except a less oily flavor |
| 8 | same as Example 7, except that the aqueous solution contains 5% soy isolate protein as a comparison to what a chip prepared by the method of Yuan, etal. would be like | essentially similar to conventional potato chips | essentially similar to conventional potato chips, except less oily texture | similar to conventional potato chips except a less oily flavor |

I claim:

1. A process for preparing a potato chip, the process consisting of;

preparing a slice of fresh, undehydrated potato, the slice having a thickness of from about 1 to about 3 millimeters, the slice having no added fat and having no added globular protein; and then heating the slice in a microwave oven at a high intensity for a period of time sufficient to produce a product having substantially the same flavor, color, and crispness as deep fat fried potato slices and having no added fat or globular protein.

2. The process of claim 1, wherein the heating time is from about 3 to about 12 minutes.

3. The process of claim 1, wherein the frequency of the microwave oven is about 2450 MHz.

4. The process of claim 1, wherein the thickness of the slice is about two millimeters.

5. The process of claim 1, wherein the step of heating is accomplished by the periodic application of microwave energy in pulses of high energy separated by periods of zero or relatively low microwave energy.

6. A process of preparing a potato chip having no added fat and no globular protein coating, the process consisting of:

preparing a slice of fresh, undehydrated potato, the slice having a thickness of from about 1 to about 3 millimeters, the slice having no fat added;

coating the surface of the slice with a non-globular protein flavorant; and then heating the slice in a microwave oven at a high intensity for a period of time sufficient to produce a product having substantially the same flavor, color and crispness as deep fat fried potato slices and having no added fat or globular protein.

7. The process of claim 6, wherein the flavorant is salt.

8. A process for preparing a potato chip, the process comprising:

preparing a slice of fresh, undehydrated potato, the slice having a thickness of from about 1 to about 3 millimeters, the slice having no added fat and no added globular protein; and then heating the slice in a microwave oven at a high intensity for a period of time sufficient to produce a product having substantially the same flavor, color, and crispness as deep fat fried potato slices and having no added fat and no added globular protein.

9. The process of the claim 8, wherein the heating time is from about 3 to about 12 minutes.

10. The process of claim 8, wherein the frequency of the microwave oven is about 2450 MHz.

11. The process of claim 8, wherein the thickness of the slice is about two millimeters.

12. The process of claim 8, wherein the step of heating is accomplished by the periodic application of microwave energy in pulses of high energy separated by periods of zero microwave energy.

* * * * *